(12) United States Patent
Theocharous et al.

(10) Patent No.: US 8,316,247 B2
(45) Date of Patent: *Nov. 20, 2012

(54) METHOD AND APPARATUS FOR USER-ACTIVITY-BASED DYNAMIC POWER MANAGEMENT AND POLICY CREATION FOR MOBILE PLATFORMS

(75) Inventors: Georgios N. Theocharous, San Jose, CA (US); Nilesh N. Shah, Rancho Cordova, CA (US); Uttam K. Sengupta, Portland, OR (US); William N. Schilit, Menlo Park, CA (US); Kelan C. Silvester, Forest Grove, OR (US); Robert A. Dunstan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 51 days.

This patent is subject to a terminal disclaimer.

(21) Appl. No.: 12/971,947

(22) Filed: Dec. 17, 2010

(65) Prior Publication Data

US 2011/0093725 A1 Apr. 21, 2011

Related U.S. Application Data

(63) Continuation of application No. 11/528,967, filed on Sep. 27, 2006, now Pat. No. 7,861,099, which is a continuation-in-part of application No. 11/479,763, filed on Jun. 30, 2006, now Pat. No. 7,861,098.

(51) Int. Cl.
*G06F 1/00* (2006.01)
(52) U.S. Cl. ........ 713/300; 713/310; 713/320; 713/321; 713/322; 713/323; 713/324; 713/330; 713/340
(58) Field of Classification Search ............... 713/300, 713/310, 320–324, 330, 340
See application file for complete search history.

(56) References Cited

U.S. PATENT DOCUMENTS

| 5,954,820 | A | 9/1999 | Hetzler |
| 7,162,279 | B2 | 1/2007 | Gupta |
| 7,293,186 | B2 | 11/2007 | Thomas et al. |
| 7,353,413 | B2 | 4/2008 | Dunstan |
| 7,506,190 | B2 | 3/2009 | Thomas et al. |
| 7,529,949 | B1 | 5/2009 | Ranganathan et al. |
| 7,861,098 | B2 * | 12/2010 | Theocharous et al. ........ 713/300 |
| 7,861,099 | B2 * | 12/2010 | Theocharous et al. ........ 713/300 |
| 2004/0163001 | A1 | 8/2004 | Bodas |
| 2005/0044241 | A1 * | 2/2005 | Dunstan ....................... 709/228 |
| 2005/0138438 | A1 | 6/2005 | Bodas |
| 2006/0053311 | A1 | 3/2006 | Chary |
| 2006/0101293 | A1 | 5/2006 | Chandley et al. |
| 2007/0118774 | A1 | 5/2007 | Thomas et al. |
| 2007/0245163 | A1 | 10/2007 | Lu et al. |
| 2007/0250729 | A1 | 10/2007 | Thomas et al. |
| 2007/0280208 | A1 | 12/2007 | Smith et al. |
| 2008/0005599 | A1 | 1/2008 | Theocharous et al. |

* cited by examiner

*Primary Examiner* — M Elamin
(74) *Attorney, Agent, or Firm* — Blakely, Sokoloff, Taylor & Zafman LLP

(57) ABSTRACT

A method and apparatus for user activity-based dynamic power management and policy creation for mobile platforms are described. In one embodiment, the method includes the monitoring of one or more sensor values of a mobile platform device to gather sensor activity data. Once the sensor activity data is gathered, the user state may be predicted according to the gathered user activity and an updated user state model. In one embodiment, the user state model is updated according to the sensor activity data. In one embodiment, a switch occurs from the present power management policy to a new power management policy if the new user state differs from a present user state by a predetermined amount. In one embodiment, at least one time-out parameter of a selected power management policy may be adjusted to comply with a predicted user state. Other embodiments are described and claimed.

20 Claims, 8 Drawing Sheets

METHOD AND APPARATUS FOR USER-ACTIVITY-BASED DYNAMIC POWER MANAGEMENT AND POLICY CREATION FOR MOBILE PLATFORMS

CROSS REFERENCE TO RELATED APPLICATION

This application is a continuation of U.S. application Ser. No. 11/528,967, filed on Sep. 27, 2006, U.S. Pat. No. 7,861,099, which is a continuation-in-part of U.S. application Ser. No. 11/479,763, filed on Jun. 30, 2006, now U.S. Pat. No. 7,861,098, and priority is claimed thereof.

FIELD

One or more embodiments relate generally to the field of integrated circuit and computer system design. More particularly, one or more of the embodiments relate to a method and apparatus for user-activity based dynamic power management scheme and policy creation for mobile platforms.

BACKGROUND

Mobile computing systems, such as laptop computers, notebook computers and handheld devices (e.g., personal digital assistants, cell phones, etc.) are usually battery-powered; and, as such, power consumption is a matter of concern. Hence, mobile computing systems are limited to a run-time dictated by the capacity of a battery used by the respective device and the load on the battery. A typical laptop's battery lasts about 5-8 hours. However, depending on the complexity of the mobile platform, the respective mobile platform can deplete power resources from its battery within a relatively short amount of time.

Today, many mobile devices are capable of entering a low power ("Sleep/Stand-by/Hibernate") state to conserve battery power when not in active use. To conserve battery power, an individual either places his/her mobile device in the Standby/Hibernate state, or the device itself automatically enters the state. Unfortunately, during such low-powered states, the device powers down most of the resources. Consequently, during either Stand-by mode or Hibernation mode, the utility of a mobile computing system is effectively non-existent because the CPU is not powered and lacks the ability to execute instructions.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In general, a method and apparatus for user activity-based dynamic power management and policy creation for mobile platforms are described. In one embodiment, the method includes the monitoring of one or more sensor values of a mobile platform device to gather sensor activity data. In one embodiment, the mobile platform device operates according to a present power management policy. Once the sensor activity data is gathered, the user state may be predicted according to the gathered sensor activity and an updated user state model. In one embodiment, the user state model is updated according to the activity data. In one embodiment, a switch occurs from the present power management policy to a new power management policy if the new user activity state differs from a present user activity state by a predetermined amount. In one embodiment, at least one time-out parameter of a selected power management policy, may be adjusted if at least one time-out parameter does not comply with a predicted user state.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

Figure 1:
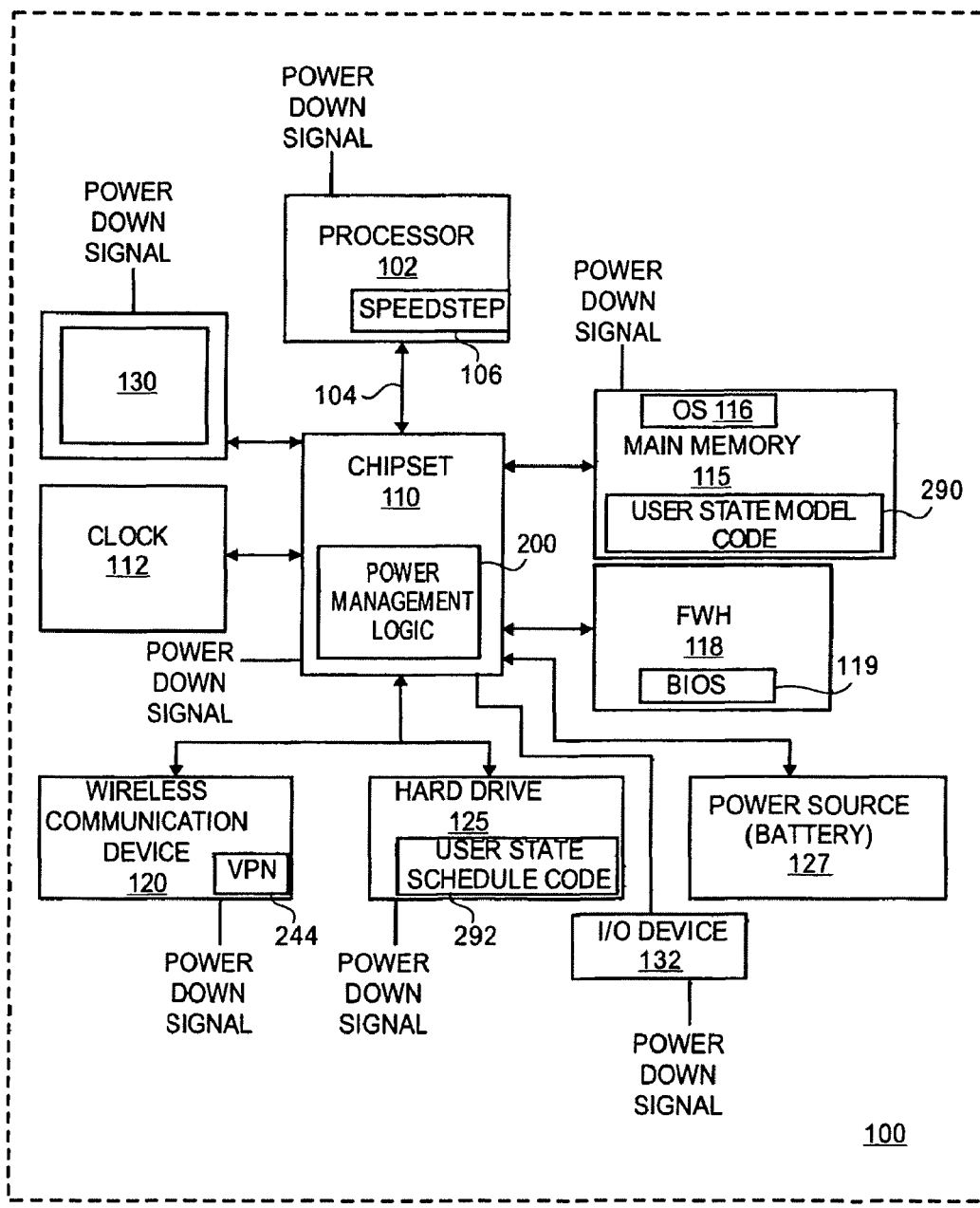
FIG. 1 is a block diagram illustrating a mobile personal computer (MPC) system including power management logic to enable user-activity-based dynamic power management and policy creation of the MPC system, in accordance with one embodiment.

FIG. 1 is a block diagram illustrating mobile personal computer (MPC) system 100 including power management logic 200 to enable user-activity-based dynamic power management and policy creation of MPC system 100, in accordance with one embodiment. As described herein, an "MPC system" may include, but is not limited to, laptop computers, notebook computers, handheld devices (e.g., personal digital assistants, cell phones, etc.), or other like battery powered computing devices.

Representatively, MPC system 100, which may be referred to herein as a "mobile platform architecture," comprises a processor system bus (front side bus (FSB)) 104 for communicating information between processor (CPU) 102 and chipset 110. In one embodiment, CPU 102 may be a multi-core processor, multiple CPUs in a single MPC, or other like configuration. As described herein, the term "chipset" is used in a manner to collectively describe the various devices coupled to CPU 102 to perform desired system functionality.

Representatively, display 130, wireless communication device 120, hard drive devices (HDD) 125, main memory 115, clock 112, input/output (I/O) device 132 and direct current (DC) power source (battery) 127 may be coupled to chipset 110 to supply DC voltage to MPC system 100. In one embodiment, chipset 110 is configured to include a memory controller hub (MCH) and/or an I/O controller hub (ICH) to communicate with I/O devices, such as wireless communications device 120. In an alternate embodiment, chipset 110 is or may be configured to incorporate a graphics controller and operate as a graphics memory controller hub (GMCH). In one embodiment, chipset 110 may be incorporated into CPU 102 to provide a system on chip.

In one embodiment, main memory 115 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. Representatively, computer system 100 further includes non-volatile (e.g., Flash) memory 150. In one embodiment, flash memory 150 may be referred to as a "firmware hub" or FWH, which may include a basic input/output system (BIOS) that is modified to perform, in addition to initialization of computer system 100, initialization of power management logic 200 to enable user-activity-based dynamic power management and policy creation of MPC system 100, according to one embodiment.

MPC systems, such as MPC system 100, laptop computers, notebook computers, handheld devices (e.g., personal digital assistants, cell phones, etc.) are often battery powered; and, as such, power consumption is a matter of concern. Examples of mobile computing devices, such as MPC system 100, may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel-cell or a battery.

Typically, the less power consumed by a mobile computing device/system, the longer the life of the battery that powers the computing system. Often, mobile computing systems are built with a "standby mode" and/or a "hibernation mode," which are collectively referred to herein as "sleep modes/states." Either of these modes substantially shut down the activity of the computing system so that battery power is conserved.

In "standby mode," the computing system's "peripherals" outside processor core 102 (e.g., its display unit 130, wireless communications device 120, HDD 125) are shut down in response to a corresponding POWER DOWN SIGNAL, while volatile memory within processing core 102 (e.g., external cache (not shown) system memory 115, etc.) is kept awake (e.g., by continuing to clock/refresh and/or otherwise apply power to external cache and system memory 115). However, some peripherals, such as the wireless communications device 120, may be placed in a lower power state where they monitor for a device specific wake event that they process and, as a result may cause the MPC to come out of standby. In one embodiment, CPU 102 may also shut down various internal units so that the processing of application software effectively ceases. Standby mode allows the system to conserve battery power consumption (because the peripherals and internal CPU units are not powered) and also allows the computing system to rapidly awake because its volatile memory was not shut down.

In "hibernation mode," the contents of the volatile memory (e.g., cache system memory 115) are first stored to non-volatile memory (e.g., HDD 125); and then, the entire system is effectively shut down. As in the "stand-by mode", some devices may remain powered to receive wake events which may bring the MPC out of this "hibernation state". Here, typically, greater power savings are realized as compared to the sleep mode because the volatile memory units are shut down. However, it takes longer for the system to return from hibernation mode to its original, normal, active state because the "state" of the system software at the time hibernation mode was entered (as represented by the matter that was transferred from volatile to non-volatile memory) needs to be "reloaded" back into volatile memory (e.g., by reading the state data from the disk drive and re-storing it back to its original locations in cache and system memory 115.)

Unfortunately, during either standby mode or hibernation mode, the utility of a mobile computing system is effectively non-existent because the CPU is not powered and lacks the ability to execute a variety of instructions. That is, useful software routines (such as, e-mail retrieval, downloading information from the Internet, etc.) cannot be executed. In one embodiment, power management logic 200 periodically predicts a user state according to one or more sensor values of MPC system 100 based on user activity. In one embodiment, power management logic 200 provides an automated mechanism for selection of an appropriate power management policy based on a predicted user state.

A power management scheme (policy) for a mobile platform (e.g., laptop) decides when to transition different components of the device to different power saving states. Existing power management approaches provide a set of time-out policies for which a user can manually decide to switch between. Unfortunately, such a manual switching mechanism can be quite inefficient and frustrating to a user. Accordingly, in one embodiment, the automated switching mechanism among different power schemes is provided by power management logic 200, as further illustrated in FIG. 2.

Figure 2:
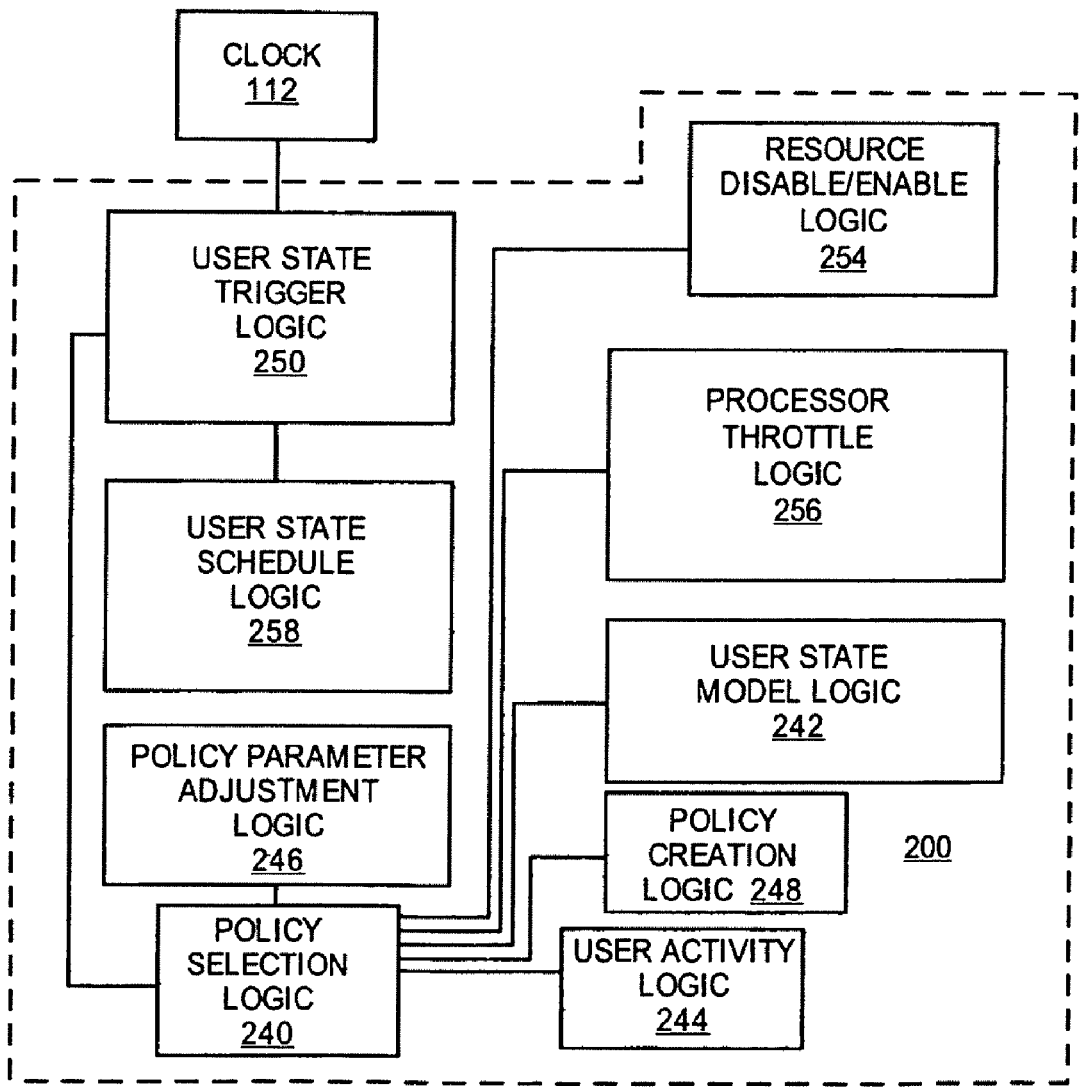
FIG. 2 is a block diagram further illustrating power management logic of FIG. 1, according to one embodiment.

FIG. 2 is a block diagram further illustrating power management logic 200 of FIG. 1, in accordance with one embodiment. Representatively, policy selection logic 240 operates as a controller to ensure that policy selection logic 200 periodically predicts a user state according to sensor values of MPC system 100 based on user activity. In one embodiment, user state schedule logic 258 is responsible for establishing a wakeup schedule when MPC system 100 is placed into a stand-by/hibernate mode, either directly (by the user) or due to user inactivity to trigger a user state update.

TABLE 1

List of Predefined Power Schemes

Super Power Saver
ThinkPad Default
High Battery Performance
CD Audio
Word Processing/E-mail
Dark Room
Example Default TABLE 1-continued List of Predefined Power Schemes High System Performance
DVD Movie
Presentation (with Projector)
On Screen Presentation
Disable Shut-off Timers

TABLE 2

EXAMPLE DEFAULT
When using battery power:

| | |
|---|---|
| System standby: | 45 mins. |
| Turn off monitor: | 15 mins. |
| LCD brightness: | Level 0 (Low) |
| Turn off hard disks: | 30 mins. |
| CPU speed: | Slow |
| System hibernates | 2 hrs. |

Example Default Settings

As described herein, sensor values of an MPC such as MPC system 100, as shown in FIG. 1, to identify sensor activity data including, but not limited to, mouse movement, keyboard activity, power consumption, time, loaded/running/in-use applications, hard drive activity, CPU activity, laptop movement, scheduled meetings, I/O device activity including CD audio, DVD movies, on-screen presentation, ambient light, GPS, radio frequency identification and the like. As further described herein, prediction of user states include, but are not limited to, various activities defined by the listing of predefined power scheme policies, as shown in Table 1. Table 2 further describes Example default power management parameters.

In one embodiment, in response to detection of the MPC system 100, user state schedule logic 258 sets a timer to notify MPC system 100 to trigger a user state update. In one embodiment, this is performed by programming user state trigger logic 250. In one embodiment, trigger logic 250 receives real-time clock input 112 and based on a timer, issues a user state update event to trigger a user state update. In response to such user state update event, resources disable logic 250 disables at least one MPC system resource (e.g., peripherals outside processor 102) to provide a minimum number of dictated by a selected power management policy.

Referring again to FIG. 2, in one embodiment, defined policy selection logic 240 receives a notification from user state trigger logic 250 to predict a new user state. In one embodiment, policy selection logic 240, using user activity logic, may monitor one or more sensor values of MPC system 100, as shown in FIG. 1. In one embodiment, user activity logic 244 generates user activity data according to the one or more monitored sensor values. In one embodiment, policy selection logic 240 directs user activity data to user state model logic 242. In one embodiment, user state model logic 242 provides machine learning to update a user state model.

In one embodiment, power management logic 200 may detect the computationally-intensive meetings and non-computationally-intensive meetings (or other user-activity events, which have varying power demands from MPC system 100). In one embodiment, a user state model is updated to enable detection and learning of user activities from sensor values of an MPC such as MPC system 100, as shown in FIG. 1, to identify sensor activity data including, but not limited to, mouse movement, keyboard activity, power consumption, time, loaded/running/in-use applications, hard drive activity, CPU activity, laptop movement, scheduled meetings, I/O device activity including CD audio, DVD movies, on-screen presentation, ambient light, GPS, network traffic, radio frequency identification and the like using, for example, machine learning technology. In one embodiment, examples of machine learning models and methods include, but are not limited to, K-nearest neighbor, decision trees, neural networks, bays nets and SCMs. In one embodiment, for each user state, a hand-specified time-out power management policy is provided. In one embodiment, power management logic defined through software or hardware control switches between power modes in an automated manner, based on user activity learning according to detected sensor activity data.

The user state model logic 242 may, for example, determine predicted times of inactivity by the user according to the user's work schedule, calendar entries and the like in reference to a current time and date. The user state model will track meetings of the user, which may be non-computationally-intensive, as well as computationally-intensive, and select a power management policy, for example, as shown in Table 1. In one embodiment, policy selection logic using the updated user state model, as well as the sensor activity data, may predict a user state. If the predicted user state differs from a present user state, policy selection logic may select a new power management policy for MPC system 100.

For example, when power management logic 200 detects that a user is headed out to lunch according to, for example, a user state model, the user may not have shut-down the machine. Accordingly, in one embodiment, policy selection logic 240 may switch MPC system 100 into the super power saver scheme policy, as listed in Table 1. In another example, sensor activity data regarding application tracking (running/loaded/in-use applications) may indicate that a user is watching a DVD with a power scheme set for super saver mode. In one embodiment, policy selection logic 240 may select DVD movie power scheme, as shown in Table 1, and automatically switch the present power scheme to the DVD movie power scheme.

In one embodiment, power management logic removes the burden of power management from the user, while at the same time, intelligently adapting to the user's activities to provide an optimum power for a given user activity to provide, for example, extended battery life to the user, as well as enhanced perceived performance to the user.

As further shown in FIG. 2, policy parameter adjustment logic 246 is provided to, for example, adjust one or more parameters of a selected power management policy. In one embodiment, parameter adjustment for a power management policy is performed if a predicted user state differs from a current user state by less than a predetermined amount or otherwise not optimal for a predicted user state. For example, as indicated above, policy selection logic 240 may detect (according to sensor activity data) that a user is headed out to lunch and forgot to shut down MPC system 100, and as a result, switches MPC system into super power saver scheme.

In one embodiment, policy selection logic 240 may detect the standby parameters are not optimally set (see, Table 2). For example, the standby parameter may be set to 5 minutes; however, it may be optimal to change this parameter to 30 seconds or less, if, for example, policy selection logic 240 infers that the user does not need immediate system start-up.

In one embodiment, for example, a user is playing CD audio. As a result, policy selection logic 240 may switch to the CD audio power scheme, as shown in Table 1. In one embodiment, policy selection logic 240 may infer (predict) that the user does not need the screen, starting immediately. Accordingly, in one embodiment, policy selection logic 240 may direct resource disable/enable logic 254 to dynamically adjust the time-out parameter to turn-off display monitor to 5 seconds instead of the 10 second default, based on user activity prediction, to save additional power. Another example might be when the user is typing in a word processing application, the CPU 102 and other components can be slowed down to a lower power setting while still maintaining sufficient performance to handle the typing input and display output.

As further shown in FIG. 2, policy creation logic 248 may identify that available power management policies do not comply with a predicted user state. As a result, in one embodiment, policy creation logic 248 may generate a new power management policy or scheme to support the predicted user state. In one embodiment, the new power management policy may be generated by modifying one or more parameters of a predefined power scheme, for example, as shown in Table 1. Procedural methods for implementing one or more of the described embodiments are now provided.

Figure 3:
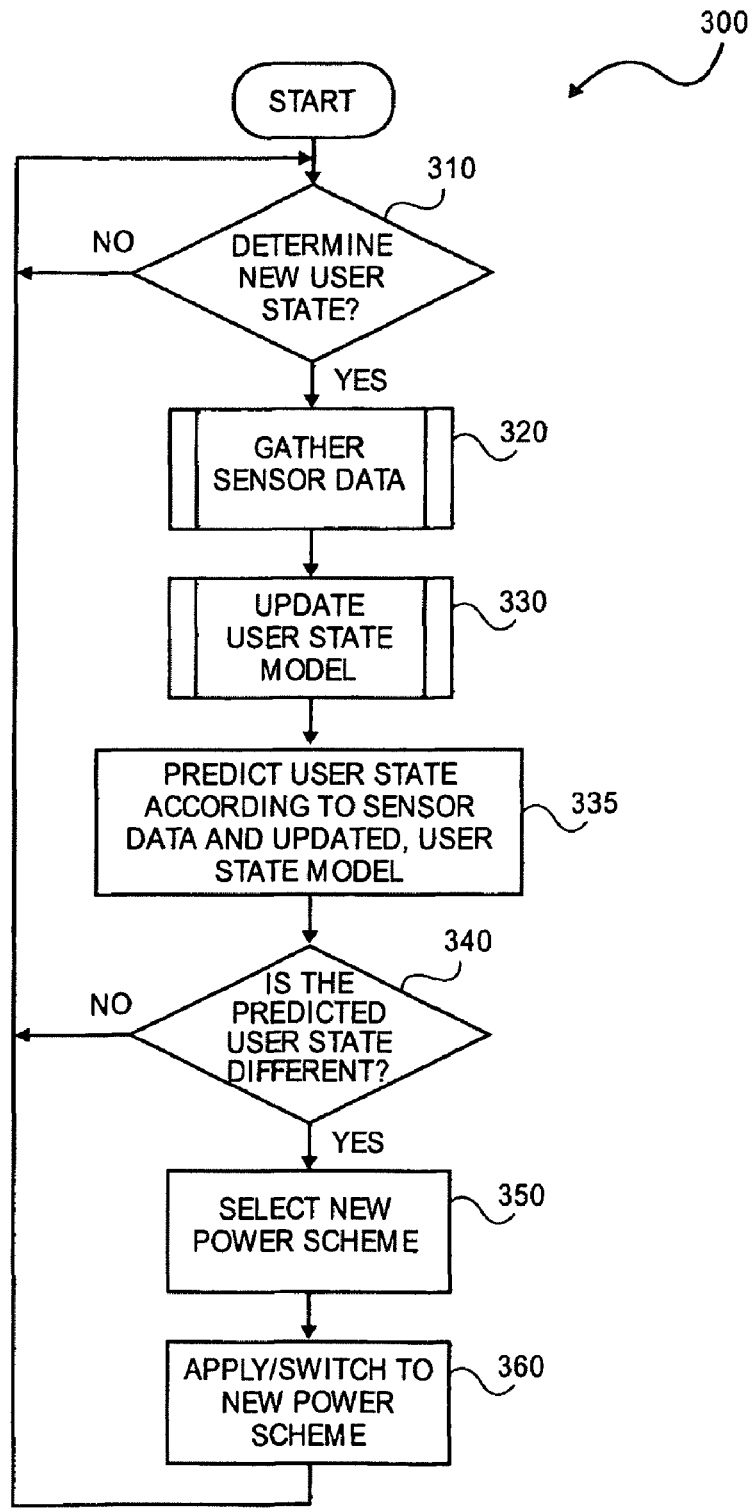
FIG. 3 is a flowchart illustrating a method for user activity-based dynamic power management in an MPC system, according to one embodiment.

Turning now to FIG. 3, the particular methods associated with various embodiments are described in terms of computer software and hardware with reference to a flowchart. The methods to be performed by a computing device (e.g., an endpoint/link controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein including, but not limited to logic programming languages (e.g., Verilog), whose instructions are compiled into logic paths executed in logic devices. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 3 is a flowchart illustrating a method 300 for user-activity-based dynamic power management and policy creation for mobile platforms, in accordance with one embodiment. In the embodiments described, examples of the described embodiments will be made with reference to FIGS. 1 and 2. However, the described embodiments should not be limited to the examples provided to limit the scope provided by the appended claims.

Referring again to FIG. 3, at process block 310, it is determined whether an event is received to trigger the determination of a new user state. When such event is received, at process block 320, sensor values may be gathered to determine sensor activity data. As described above, sensor activity data includes, but is not limited to, mouse movement, keyboard activity, power consumption, time, loaded/running/in-use applications, hard drive activity, CPU activity, laptop movement, types of scheduled meetings, multimedia activities including CD, DVD or the like, ambient light, GPS, RFID and other like activities. Based on the gathered sensor activity data, at process block 330, a user state model may be updated. In one embodiment, the user state model uses machine learning to predict user activities according to present sensor activity data.

Referring again to FIG. 3, at process block 335, a user state is predicted according to the sensor activity data and the updated user state model. At process block 340, it is determined whether the predicted user state is different than a present user state. In one embodiment, when the predicted user state is different than a present user state by a predetermined amount, a new power scheme is selected by, for example, policy selection logic 240, as shown in FIG. 2.

In one embodiment, at process block 360, a switch occurs between the present power scheme and the new power scheme using, for example, resource disable/enable logic 254 to enable or disable resources as required to comply with the new power management policy, as shown in FIG. 2. In addition, in one embodiment, system resources may be placed in a reduced power state. In one embodiment, processor throttle logic 256 may alter an operating speed of the processor, utilizing, for example, speed step logic 106, as shown in FIG. 1, as dictated by the new power management policy.

Figure 4:
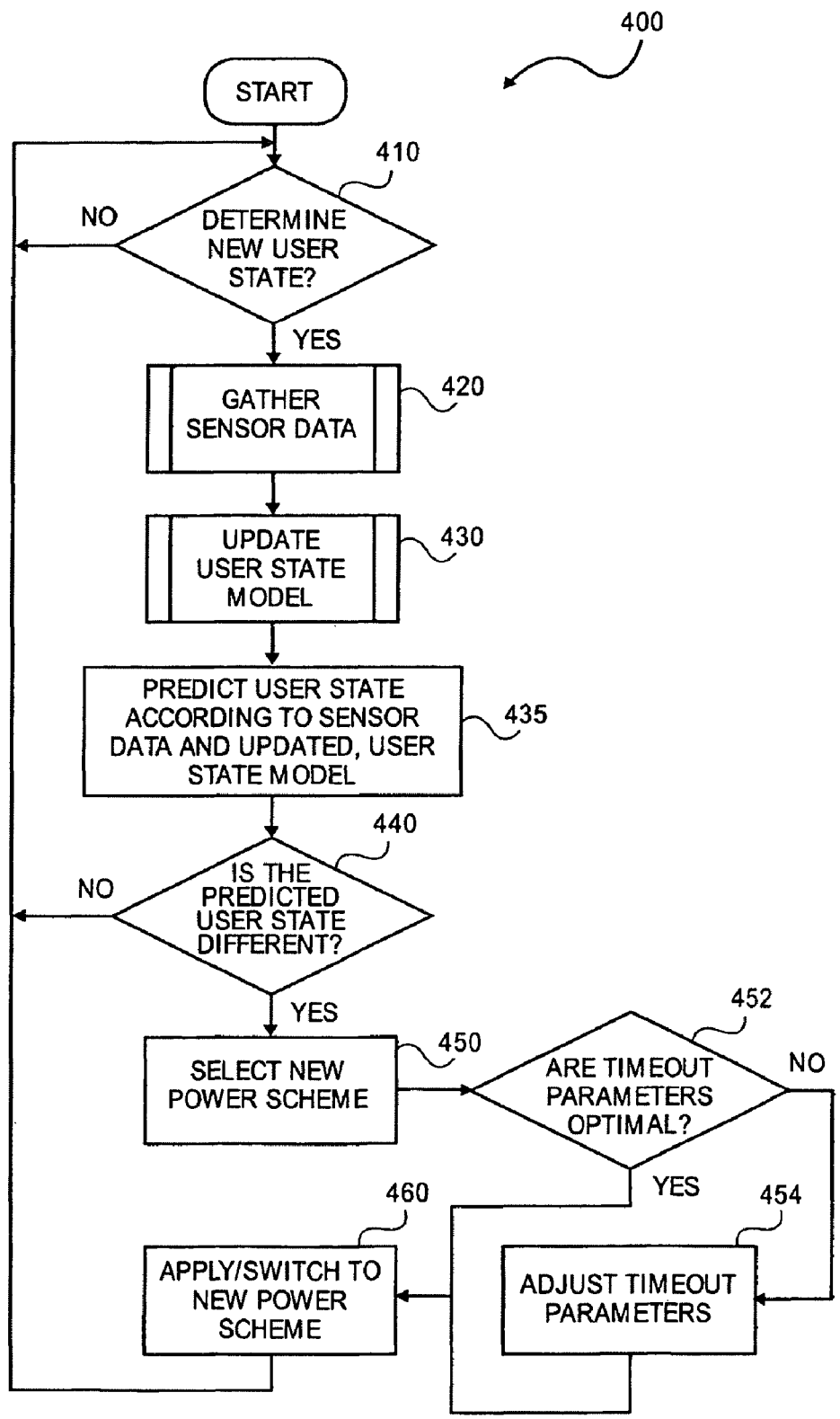
FIG. 4 is a flowchart illustrating a method for adjustment of one or more time-out power parameters of a power management policy, according to one embodiment.

FIG. 4 is a flowchart illustrating a method 400 for optimizing one or more parameters of a power management scheme, according to one embodiment. In the embodiment illustrated, process blocks 410-450 are analogous to process blocks 310-350, as shown in FIG. 3. However, at process block 452, it is determined whether time-out parameters of the selected power scheme are optimal. In one embodiment, when at least one of the parameters of the selected power management scheme is not optimal, the parameter may be adjusted at process block 454 using, for example, policy parameter adjustment logic 246, as shown in FIG. 2, according to one embodiment. Once the time-out parameters are adjusted, at process block 454, a switch to the new power scheme is provided at process block 460.

Figure 5:
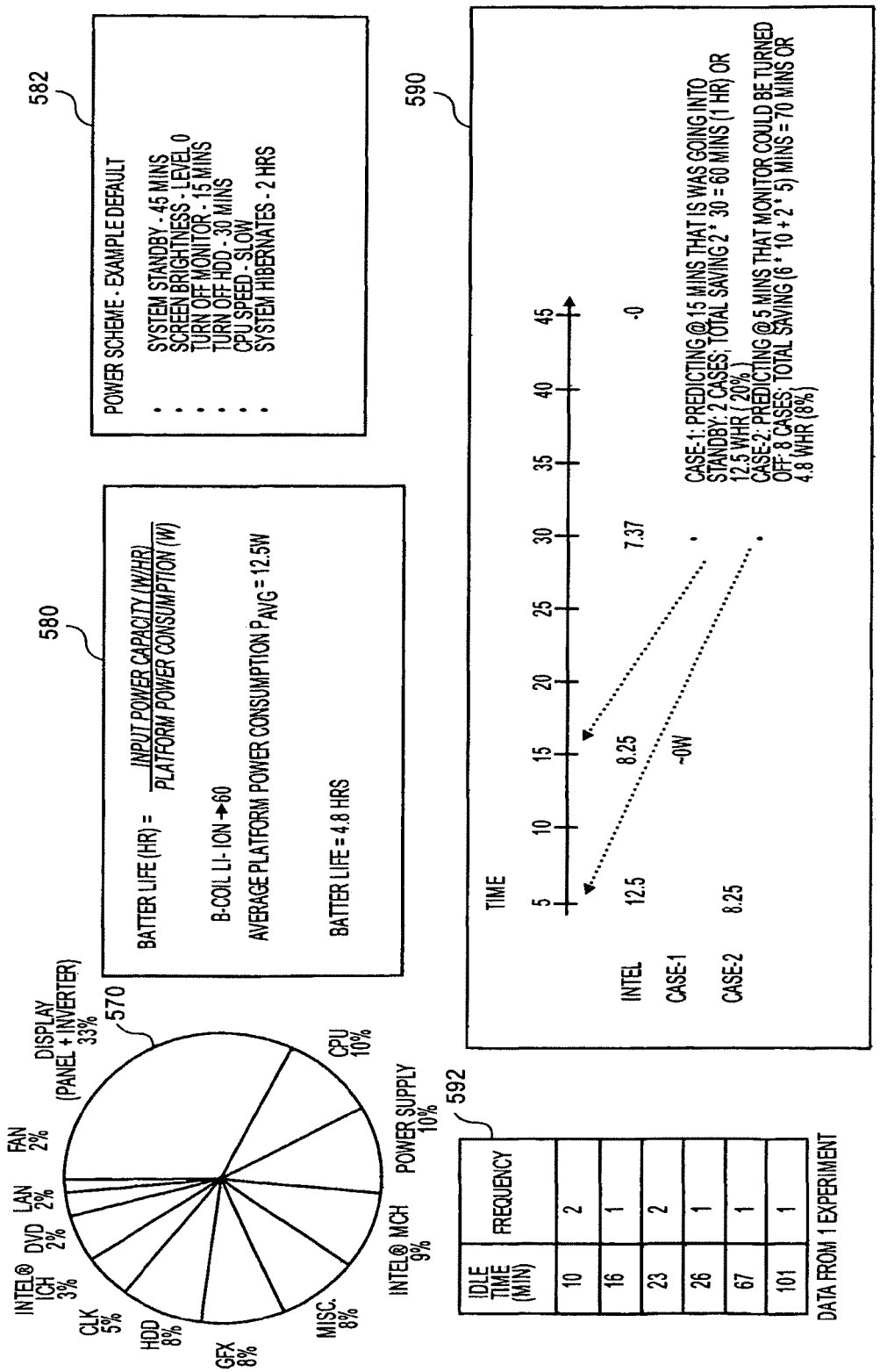
FIG. 5 is a block diagram illustrating power savings provided from a modified power management policy, according to one embodiment.

FIG. 5 is a block diagram illustrating power savings provided by dynamically adapted power management policy based on user-predicted activity. Representatively, pie chart 570 in the upper left-hand corner illustrates average power consumption of, for example, an MPC system 100. The center upper box 580 contains an estimation of the average battery, life, which is approximately 4.8 hours. The right upper box 582 illustrates time-out parameters of the example default power management scheme, as listed in Table 2. Table 592 in the lower left corner illustrates the frequency of idle times collected from monitoring of sensor values of MPC system 100.

As shown in FIG. 5, the box 590 in the right corner suggests that there are considerable amounts of power savings if prediction for a component may be provided to determine when the component is needed. For example, if we could predict that the 15 minutes that the machine would go into standby a 20% power savings is provided. As further illustrated in FIG. 5, if it could be predicted that the fifth minute that the monitor should be turned off, an eight percent savings is provided. Accordingly, in one embodiment, based on such predictions, power management policy parameters, as shown in Table 1 (e.g., standby, turn-off monitor, etc.) can be dynamically adapted to the user's predicted activity.

Figure 6:
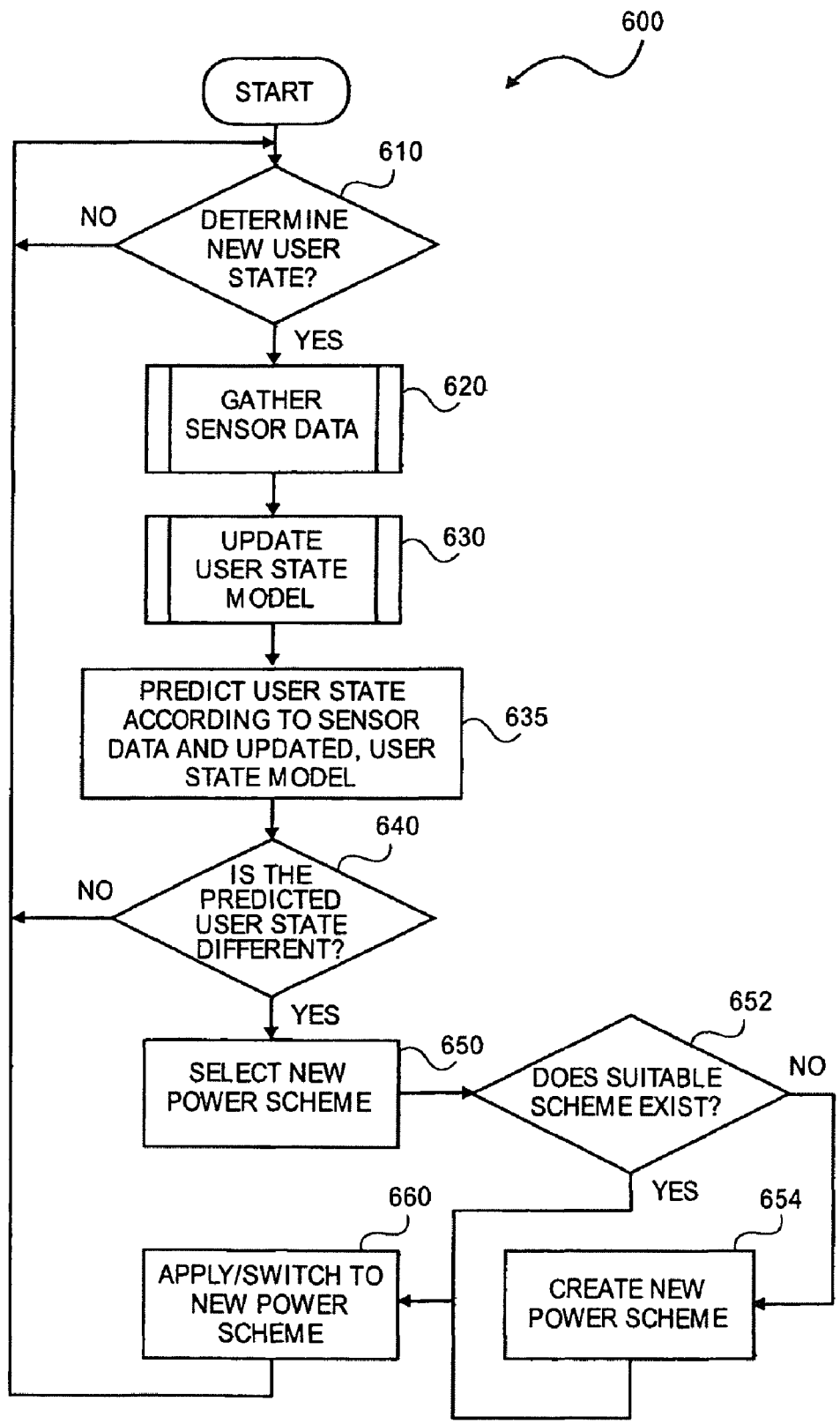
FIG. 6 is a flowchart illustrating a method for user activity-based power management policy creation for an MPC system, according to one embodiment.

FIG. 6 is a flowchart illustrating a method for generating a new power management for an MPC system, according to one embodiment. As shown in FIG. 6, process blocks 610-650 are analogous to process blocks 310-350 and 410-450 of FIGS. 3 and 4. However, at process block 652, it may be determined whether a suitable power scheme exists for a predicted user state.

For example, when policy selection logic detects (according to sensor activity data) that the user is leaving the office for home at 5:00 p.m. (and typically does not need the computer until 10:00 p.m. to check mail), a new power scheme may be created for this user, which puts the system into standby at 5:00 p.m., but then schedules it for wake-up at 9:55 p.m. In one embodiment, real time clock circuitry, for example, as shown in FIG. 2, may trigger a user state update. In one embodiment, real time clock 112 is awake, even in standby or hibernate states, as described above.

Accordingly, in one embodiment, dynamic policy creation, for example, using policy creation logic 248 of FIG. 2, may, based on a user state model, which models user activities, determine preferences and behaviors and create a simple power scheme to match the predicted user state. Accordingly, as shown at process block 654 of FIG. 6, a new power scheme may be created at process block 654; and subsequently, at process block 660, a switch from the current power scheme to the new power scheme is provided.

Figure 7:
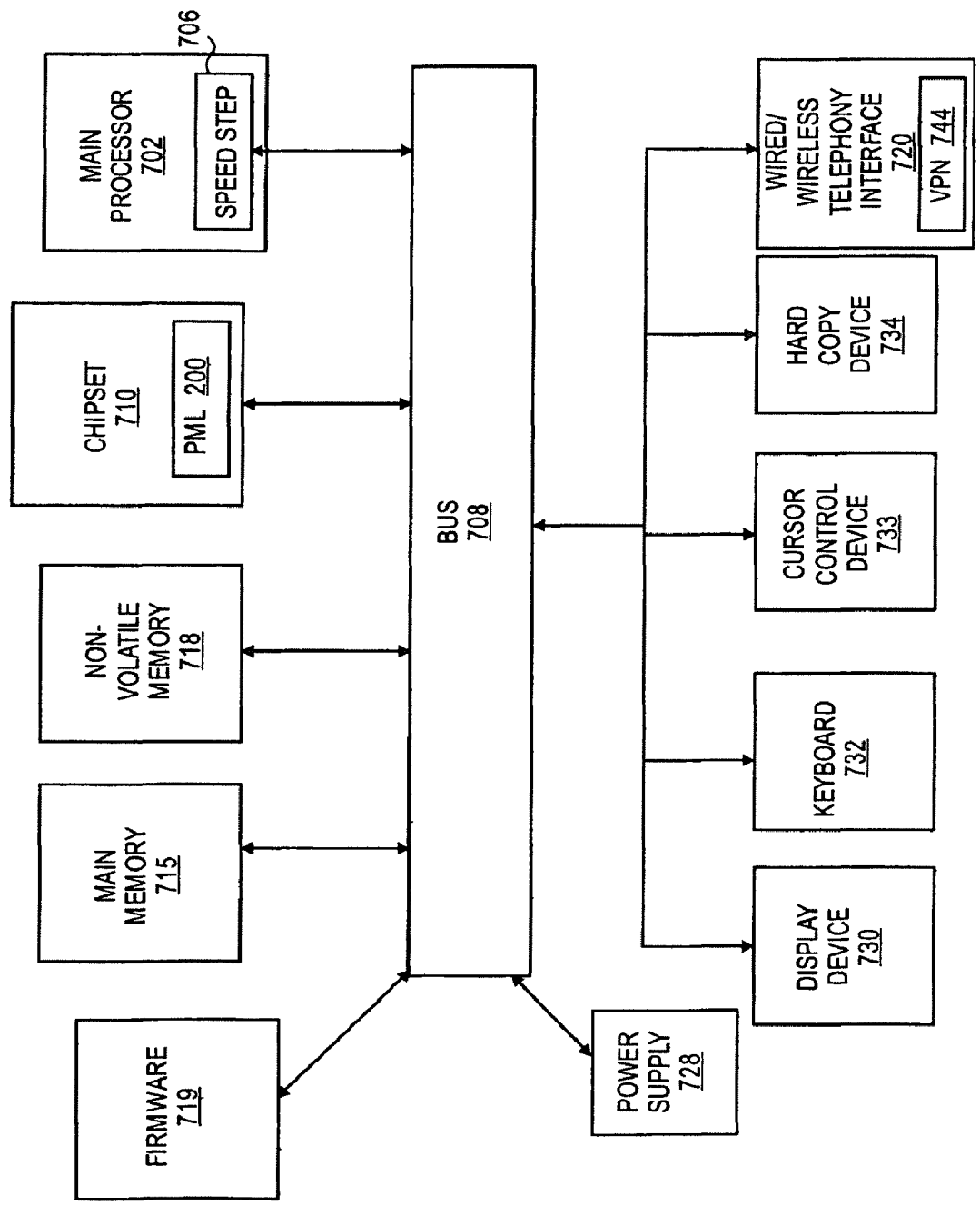
FIG. 7 is a block diagram illustrating a mobile platform architecture to provide a power efficient framework to maintain data synchronization of a mobile platform computer to simulate a noise connected scenario, according to one embodiment.

FIG. 7 illustrates a block diagram of an example computer system that may use an embodiment of a power-efficient framework for user-activity-based dynamic power management and policy creation for mobile platforms computer, according to one embodiment. In one embodiment, computer system 700 comprises a communication mechanism or bus 708 for communicating information, and an integrated circuit component such as a main processing unit 702 coupled with bus 708 for processing information. One or more of the components or devices in the computer system 700 such as the main processing unit 702 or a chipset 710 may use an embodiment of the power management logic 200, as shown in FIG. 2. The main processing unit 702 may consist of one or more processor cores working together as a unit.

Computer system 700 further comprises a random access memory (RAM) or other dynamic storage device 715 (referred to as main memory) coupled to bus 708 for storing information and instructions to be executed by main processing unit 702. Main memory 715 also may be used for storing temporary variables or other intermediate information during execution of instructions by main processing unit 702.

Firmware 719 may be a combination of software and hardware, such as Electronically Programmable Read-Only Memory (EPROM) that has the operations for the routine recorded on the EPROM. The firmware 719 may embed foundation code, basic input/output system code (BIOS), or other similar code. The firmware 719 may make it possible for the computer system 600 to boot itself.

Computer system 700 also comprises a read-only memory (ROM) and/or other static storage device 718 coupled to bus 708 for storing static information and instructions for main processing unit 702. The static storage device 718 may store OS level and application level software.

Computer system 700 may further be coupled to or have an integral display device 730, such as a cathode ray tube (CRT) or liquid crystal display (LCD), coupled to bus 708 for displaying information to a computer user. A chipset may interface with the display device 730.

An alphanumeric input device (keyboard) 732, including alphanumeric and other keys, may also be coupled to bus 708 for communicating information and command selections to main processing unit 702. An additional user input device is cursor control device 733, such as a mouse, trackball, trackpad, stylus, or cursor direction keys, coupled to bus 708 for communicating direction information and command selections to main processing unit 702, and for controlling cursor movement on a display device 730. A Chipset may interface with the input/output devices.

Another device that may be coupled to bus 708 is a power supply such as a battery and Alternating Current adapter circuit. Furthermore, a sound recording and playback device, such as a speaker and/or microphone (not shown) may optionally be coupled to bus 708 for audio interfacing with computer system 700. Another device that may be coupled to bus 708 is a wireless communication module 720. The wireless communication module 720 may employ a Wireless Application Protocol to establish a wireless communication channel. The wireless communication module 720 may implement a wireless networking standard, such as the 802.11 Standard.

As shown in FIG. 7, wireless communication device 720 may operate according to a wireless network protocol, such as, for example, the Institute of Electronic Engineers (IEEE) 802.11 Standard (e.g., IEEE Std. 802.11-1997, 802.11a, 802.11e, 802.11n, etc.). In one embodiment, wireless communications device may operate according to an 802.11 Standard for providing a mobile user with a connection to a local area network (LAN) through a radio frequency (RF) connection. However, it should be recognized that access to a wireless local area network (WLAN) is not limited to the 802.11 Standard, but may include Hyper-Lan2, as well as future potential standards for any point-to-point wireless link or network.

In one embodiment, wireless communication device 720 may provide support for a wireless network protocol for connection to a wireless wide area network (WWAN). In one embodiment, wireless communications device 720 may include virtual private network (VPN) logic 744 for automating access to a wireless network without user intervention.

In one embodiment, the software used to facilitate the routine can be embedded onto a machine-readable medium. A machine-readable medium includes any mechanism that provides (i.e., stores and/or transmits information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Figure 8:
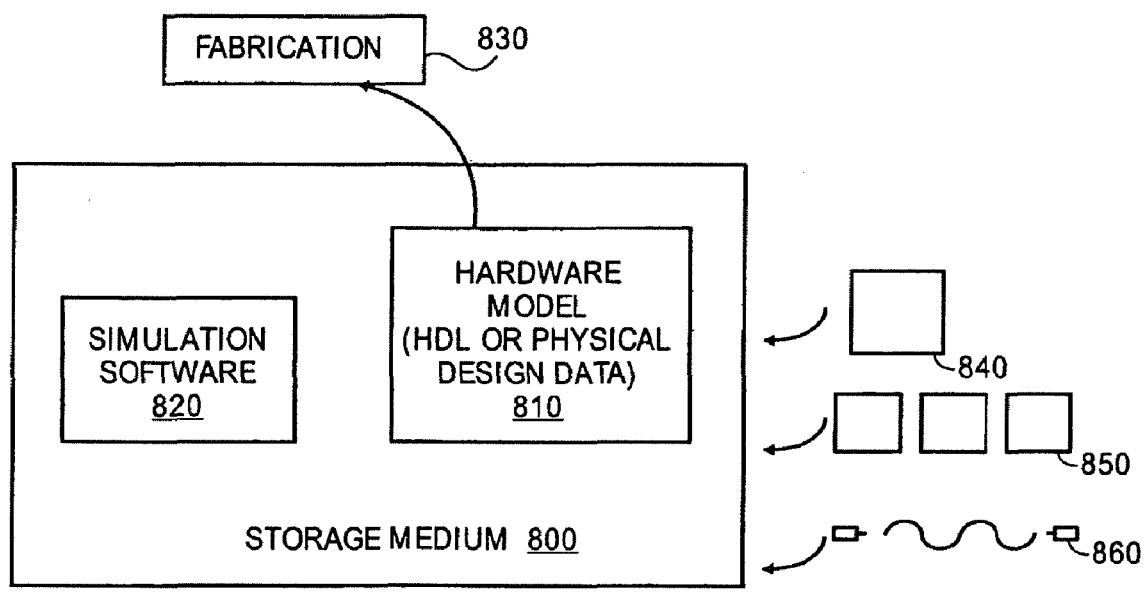
FIG. 8 is a block diagram illustrating various design representations or formats for simulation, emulation and fabrication of a design using the disclosed techniques.

FIG. 8 is a block diagram illustrating various representations or formats for simulation, emulation and fabrication 830 of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 810 may be stored in a storage medium 800, such as a computer memory, so that the model may be simulated using simulation software 820 that applies a particular test suite to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 860 modulated or otherwise generated to transport such information, a memory 850 or a magnetic or optical storage 840, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 100 includes a single CPU 102, for other embodiments, a multiprocessor system (where one or more processors may be similar in configuration and operation to the CPU 102 described above) may benefit from the sensor-activity-based dynamic power management and policy creation for mobile platforms of various embodiments. Further different type of system or different type of computer system such as, for example, a server, a workstation, a desktop computer system, a gaming system, an embedded computer system, a blade server, etc., may be used for other embodiments.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
operating a computing device according to a first power management policy;
monitoring one or more sensor values of the computing device;
predicting a new user state according to the monitored sensor values and an updated user state model, wherein predicting includes periodically predicting changing user states based on updates to state models, wherein a user state model is updated according to user activity data relating to user activity; and
switching from the first power management policy to a second power management policy if the new user state differs from a present user state by a predetermined amount.

2. The method of claim 1, wherein switching the present power management policy comprises:
placing at least one system resource in a reduced power state as indicated by the second power management policy.

3. The method of claim 2, wherein disabling the at least one system resource comprises:
disabling a display for operation according to the second power management policy.

4. The method of claim 1, wherein switching the first power management policy further comprises:
throttling a system processor to operate at a reduced frequency.

5. The method of claim 1, wherein monitoring the one or more sensor values further comprises:
monitoring one or more of a user mouse movement, a user keyboard activity, a hard drive activity, a CPU activity, power consumption, time, loaded/running/in-use applications and a device movement to form sensor activity data;
storing the sensor activity data; and
updating a user state model according to the sensor activity data.

6. The method of claim 1, wherein switching the current power management state further comprises:
placing at least one system resource in an increased power state as indicated by the second power management policy.

7. The method of claim 1, wherein switching from the current power management policy further comprises:
comparing the new user state to the present user state;
selecting the second power management policy if the new user state differs from the present user state by the predetermined amount; and altering a time-out policy of the first power management state if the new user state differs from the current state by less than the predetermined amount.

8. The method of claim 1, further comprising:
detecting a first sensor value indicating the user activity to enable a disabled resource; and
adjusting a time-out policy of the resource to increase a first value established for a timeout parameter.

9. A non-transitory machine readable medium storing instructions, which when executed by a machine, to cause the machine to perform the following operations, comprising:
predicting a new user state based on user activity according to one or more monitored sensor values of a computing device, wherein predicting includes periodically predicting changing user states based on updates to state models, wherein a user state model is updated according to user activity data relating to the user activity;
comparing a predicted user state to one or more power management policies if the predicted user state does not match a first user state;
generating a second power management policy if each of the one or more available power management policies do not comply with the predicted user state; and
switching from a first power management policy to the second power management policy.

10. The non-transitory machine readable storage medium storing instructions of claim 9, to cause the machine to perform further operations, comprising: adjusting a time-out parameter of the second power management policy if the at least one time-out parameter does not comply with the predicted user state.

11. The non-transitory machine readable storage medium storing instructions of claim 9 wherein the prior to predicting further comprises:
detecting a new user state notification according to a timer, wherein the timer is set to periodically notify the computing device to determine a new user state.

12. The non-transitory machine readable medium storing instructions of claim 9 wherein the switching the current power management policy comprises: disabling at least one system resource to provide a minimum number of system resources dictated by the second power management policy.

13. A non-transitory machine readable medium storing instructions, which when executed by the machine, to cause the machine to perform the following operations, comprising:
detecting a first user state notification according to a timer, wherein the timer is set to periodically notify the system to determine the first user state;
predicting the first user state based on gathered user activity as indicated by one or more sensor values of a computing device operating according to a first power management policy, wherein predicting includes periodically predicting changing user states based on updates to state models, wherein a user state model is updated according to the gathered user activity data;
selecting a second power management scheme if the first user state differs from a second user state by a predetermined amount; and
adjusting a time-out parameter of the selected second power management scheme if the time-out parameter does not comply with the first user state.

14. The non-transitory machine readable medium storing instructions of claim 13, to cause the machine to perform further operations prior to the operation of detecting wakeup notification, comprising:
generating a second power management policy if one or more available power management policies do not comply with the first user state; and
switching from the first power management policy to the second power management policy.

15. The non-transitory machine readable medium storing instructions of claim 13, to cause the machine to perform further operations prior to the operation of detecting wakeup notification, comprising:
monitoring one or more of a user mouse movement, a user keyboard activity power consumption, time, loaded/running/in-use applications, a hard drive activity, a CPU activity and a laptop movement to form sensor activity data;
storing the sensor activity data; and
updating a user state model according to the sensor activity data.

16. A system comprising:
a clock to trigger a new user state alarm;
a direct current (DC) power source, wherein the DC power source couples to the clock;
a processor coupled to the DC power source, the processor having at least one power state condition to cause the processor to perform at a selected operating mode; and
a chipset coupled to the processor, the chipset including power management logic configured to predict a new user state in response to the triggered user state alarm by monitoring one or more sensor values, to select a new power management policy if the predicted user state differs from a previous user state and to switch from a current power management policy to the new power management policy, wherein predicting includes periodically predicting changing user states based on updates to state models, wherein a user state model is updated according to user activity data relating to user activity.

17. The system of claim 16, wherein the logic further comprises: policy parameter adjustment logic configured to adjust a time-out parameter of a power management policy if a value of the time-out parameter does not comply with the predicted user state, wherein the policy parameter adjustment logic monitors the power management logic.

18. The system of claim 16, further comprising:
a display, the display to be illuminated in response if required by the new power management policy established by the power management logic.

19. The system of claim 16, wherein the power management logic is further configured to throttle the processor to operate at a reduced frequency from its current frequency according to the new power management policy.

20. The system of claim 16, further comprising:
user state logic coupled to the Direct Current power source, wherein the user state logic to detect a new user state notification according to a timer.

* * * * *